United States Patent
Wu et al.

(10) Patent No.: US 11,476,762 B2
(45) Date of Patent: Oct. 18, 2022

(54) POWER CONVERTER INCLUDING SWITCH COMPONENTS HAVING DIFFERENT SAFE OPERATING AREAS

(71) Applicant: ANPEC ELECTRONICS CORPORATION, Hsinchu (TW)

(72) Inventors: Cheng-Han Wu, Hsinchu (TW); Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 38 days.

(21) Appl. No.: 17/322,904

(22) Filed: May 18, 2021

(65) Prior Publication Data
US 2022/0271658 A1 Aug. 25, 2022

(30) Foreign Application Priority Data
Feb. 20, 2021 (TW) .................................. 110105927

(51) Int. Cl.
*H02M 3/158* (2006.01)
*H02M 1/08* (2006.01)

(52) U.S. Cl.
CPC .............. *H02M 3/158* (2013.01); *H02M 1/08* (2013.01)

(58) Field of Classification Search
CPC ...... H02M 1/0043; H02M 1/08; H02M 1/088; H02M 1/32; H02M 1/36; H02M 1/38; H02M 3/04; H02M 3/156; H02M 3/158
See application file for complete search history.

(56) References Cited

U.S. PATENT DOCUMENTS

| | | | | |
|---|---|---|---|---|
| 8,803,494 B2* | 8/2014 | D'Angelo | ............... | H02M 1/08 363/127 |
| 2018/0088614 A1* | 3/2018 | Choi | ....................... | H02P 9/307 |
| 2019/0103804 A1* | 4/2019 | Knoedgen | ............ | H02M 1/096 |
| 2021/0099115 A1* | 4/2021 | Krishnamurthy | .. | G01R 19/0092 |
| 2022/0255311 A1* | 8/2022 | Jiang | ....................... | H03K 5/24 |

* cited by examiner

*Primary Examiner* — Matthew V Nguyen
(74) *Attorney, Agent, or Firm* — Li & Cai Intellectual Property Office

(57) ABSTRACT

A power converter including switch components having different safe operating areas is provided. A first terminal of a first high-side switch is coupled to a common voltage. A first terminal of a first low-side switch is connected to a second terminal of the first high-side switch. A second terminal of the first low-side switch is grounded. A first terminal of a second low-side switch is connected to a node between the second terminal of the first high-side switch and the first terminal of the first low-side switch. A second terminal of the second low-side switch is grounded. A safe operating area of the second low-side switch is larger than a safe operating area of the first low-side switch. After the first low-side switch is turned off, the second low-side switch is turned off. Before the first low-side switch is turned on, the second low-side switch is turned on.

14 Claims, 8 Drawing Sheets

POWER CONVERTER INCLUDING SWITCH COMPONENTS HAVING DIFFERENT SAFE OPERATING AREAS

CROSS-REFERENCE TO RELATED PATENT APPLICATION

This application claims the benefit of priority to Taiwan Patent Application No. 110105927, filed on Feb. 20, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter including switch components having different safe operating areas.

BACKGROUND OF THE DISCLOSURE

Power converters have been widely used in various electronic products. The power converters are configured to convert power and supply the converted power to the electronic products. The power converters such as switching power converters are often used as chargers of the electronic products. Transistors are components included in a driver circuit of the switching power converter. When the transistors are switched, the power is converted.

However, when a low-side transistor among the transistors of the power converter is being switched from an on state to an off state, Miller flat regions appear in signals of the power converter that are indicated by dotted lines A in FIGS. 7 and 8. Conversely, when the low-side transistor of the power converter is being switched from the off state to the on state, a Miller flat region appears in the signal of the power converter that is indicated by a dotted line B in FIG. 8. At this time, the low-side transistor has a lowest withstand voltage and thus is damaged due to an excessive voltage across a drain and a source of the low-side transistor.

When a high-side transistor among the transistors of the power converter is being switched from an off state to an on state or switched from the on state to the off state, Miller flat regions appear in signals of the power converter that are indicated by dotted lines A and B in FIG. 9. At this time, the high-side transistor has a lowest withstand voltage, but energy of an inductor L is released such that a voltage of a node between the high-side transistor and the low-side transistor increases to 0.7V. As a result, the high-side transistor is damaged due to an excessive voltage across a drain and a source of the high-side transistor.

Therefore, the transistors used in the power converter must have high withstand voltages, thereby preventing the transistors from being damaged due to the excessive voltages when the Miller flat regions appear. A large layout area in the power converter is required to realize small on-resistances (RONs) of the transistors that have high withstand voltages, which incurs an increase in cost.

SUMMARY OF THE DISCLOSURE

In response to the above-referenced technical inadequacies, the present disclosure provides a power converter including switch components having different safe operating areas. The power converter includes a first high-side switch, a second low-side switch, a high-side driver circuit and a low-side driver circuit. A first terminal of the first high-side switch is coupled to a common voltage. A first terminal of the first low-side switch is connected to a second terminal of the first high-side switch. A second terminal of the first low-side switch is grounded. A first terminal of the second low-side switch is connected to a first node between the second terminal of the first high-side switch and the first terminal of the first low-side switch. A second terminal of the second low-side switch is grounded. The first node is grounded through a series circuit. An inductor is connected to a capacitor in series to form the series circuit. The high-side driver circuit is connected to a control terminal of the first high-side switch and configured to turn on or off the first high-side switch. The low-side driver circuit is connected to a control terminal of the first low-side switch, and configured to turn on or off the first low-side switch. A safe operating area of the second low-side switch is larger than a safe operating area of the first low-side switch. The first high-side switch and the first low-side switch are switched complementarily. After the low-side driver circuit turns off the first low-side switch, the low-side driver circuit turns off the second low-side switch. Before the low-side driver circuit turns on the first low-side switch, the low-side driver circuit turns on the second low-side switch.

In certain embodiments, the power converter including switch components having different safe operating areas includes a resistor connected to the capacitor in parallel. An output node between the capacitor and the inductor is an output terminal of the power converter.

In certain embodiments, the low-side driver circuit includes a first NOR gate, a second NOR gate, a first NOT gate, a second NOT gate, a first AND gate, and a second AND gate. A first input terminal of the first NOR gate is connected to the control terminal of the first high-side switch. A second input terminal of the first NOR gate is connected to an output terminal of a pulse wave signal generator. Two input terminals of the first AND gate are respectively connected to an output terminal of the first NOR gate and a control terminal of the second low-side switch. An output terminal of the first AND gate is connected to the control terminal of the first low-side switch. Two input terminals of the second NOR gate are respectively connected to the output terminal of the first NOR gate and the control terminal of the first low-side switch. An output terminal of the second NOR gate is connected to an input terminal of the second NOT gate. An output terminal of the second NOT gate is connected to the control terminal of the second low-side switch. An input terminal of the first NOT gate is connected to the control terminal of the second low-side switch. Two input terminals of the second AND gate are respectively connected to the output terminal of the second NOR gate and an output terminal of the first NOT gate. An input terminal of the high-side driver circuit is connected to an output terminal of the second AND gate and the output terminal of a pulse wave signal generator.

In certain embodiments, the power converter including switch components having different safe operating areas includes a first buffer. The first buffer is connected between the output terminal of the first AND gate and the control terminal of the first low-side switch.

In certain embodiments, the power converter including switch components having different safe operating areas includes a second buffer. The second buffer is connected between the output terminal of the second NOT gate and the control terminal of the second low-side switch.

In certain embodiments, the power converter including switch components having different safe operating areas includes a second high-side switch. A first terminal of the second high-side switch is coupled to the common voltage. A control terminal of the second high-side switch is connected to an output terminal of the high-side driver circuit. A second terminal of the second high-side switch is connected to the first terminal of the second low-side switch. A second node between the second terminal of the second high-side switch and the first terminal of the second low-side switch is grounded through the series circuit. A safe operating area of the second high-side switch is larger than a safe operating area of the first high-side switch.

In certain embodiments, the high-side driver circuit includes a third AND gate, a fourth AND gate, a third NOR gate, a third NOT gate, a fourth NOT gate and a first NAND gate. A first input terminal of the third AND gate is connected to the output terminal of a pulse wave signal generator. A second input terminal of the third AND gate is connected to the output terminal of the second AND gate. A first input terminal of the fourth AND gate is connected to an output terminal of the third AND gate. A second input terminal of the fourth AND gate is connected to the control terminal of the second high-side switch. The output terminal of the second AND gate is connected to the control terminal of the first high-side switch. Two input terminals of the third NOR gate are respectively connected to the output terminal of the third AND gate and the control terminal of the first high-side switch. An output terminal of the third NOR gate is connected to an input terminal of the third NOT gate. An output terminal of the third NOT gate is connected to the control terminal of the second high-side switch. An input terminal of the fourth NOT gate is connected to the control terminal of the second low-side switch. Two input terminals of the first NAND gate are respectively connected to the output terminal of the third NOR gate and an output terminal of the fourth NOT gate. An output terminal of the first NAND gate is connected to the first input terminal of the first NOR gate.

In certain embodiments, the power converter including switch components having different safe operating areas includes a delay circuit. The delay circuit is connected between the output terminal of the first NAND gate and the first input terminal of the first NOR gate.

In certain embodiments, the power converter including switch components having different safe operating areas includes a potential converter circuit. The potential converter circuit is connected between an output terminal of the delay circuit and the first input terminal of the fourth AND gate.

In certain embodiments, the power converter including switch components having different safe operating areas includes a second high-side switch. A first terminal of the second high-side switch is coupled to the common voltage. A control terminal of the second high-side switch is connected to an output terminal of the high-side driver circuit. A second terminal of the second high-side switch is connected to the first terminal of the second low-side switch. A second node between the second terminal of the second high-side switch and the first terminal of the second low-side switch is grounded through the series circuit. A safe operating area of the second high-side switch is larger than a safe operating area of the first high-side switch.

In certain embodiments, after the high-side driver circuit turns off the first high-side switch, the high-side driver circuit turns off the second high-side switch. Before the high-side driver circuit turns on the first high-side switch, the high-side driver circuit turns on the second high-side switch.

In certain embodiments, the high-side driver circuit includes a first AND gate, a second AND gate, a first NOR gate, a first NOT gate, a second NOT gate and a first NAND gate. A first input terminal of the first AND gate is connected to an output terminal of a pulse signal generator. A second input terminal of the first AND gate is connected to an output terminal of the low-side driver circuit. A first input terminal of the second AND gate is connected to an output terminal of the first AND gate. A second input terminal of the second AND gate is connected to the control terminal of the second high-side switch. An output terminal of the second AND gate is connected to an input terminal of the high-side driver circuit. The output terminal of the second AND gate is connected to the control terminal of the first high-side switch. A first input terminal of the first NOR gate is connected to the output terminal of the first AND gate. A second input terminal of the first NOR gate is connected to the control terminal of the first high-side switch. An output terminal of the first NOR gate is connected to an input terminal of the first NOT gate. An output terminal of the first NOT gate is connected to the control terminal of the second high-side switch. An input terminal of the second NOT gate is connected to a control terminal of the second low-side switch. Two input terminals of the first NAND gate are respectively connected to the output terminal of the first NOR gate and an output terminal of the second NOT gate. An output terminal of the first NAND gate is connected to an input terminal of the low-side driver circuit.

In certain embodiments, the power converter including switch components having different safe operating areas includes a potential converter circuit. The potential converter circuit is connected between the output terminal of the first AND gate and the first input terminal of the second AND gate.

In certain embodiments, the power converter including switch components having different safe operating areas includes a first buffer. The first buffer is connected between the output terminal of the second AND gate and the control terminal of the first high-side switch.

As described above, the present disclosure provides the power converter including switch components having different safe operating areas. The two high-side switches or the two low-side switches have different safe operating areas and are used in the power converter of the present disclosure. Only small layout area in the power converter needs to be used to realize small on-resistances (RONs) of the low-side and high-side switches. Therefore, a size of the power converter is reduced. The high-side switch or low-side switch that has a poor withstand voltage is prevented from being damaged due to the excessive voltage or an excessive current.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
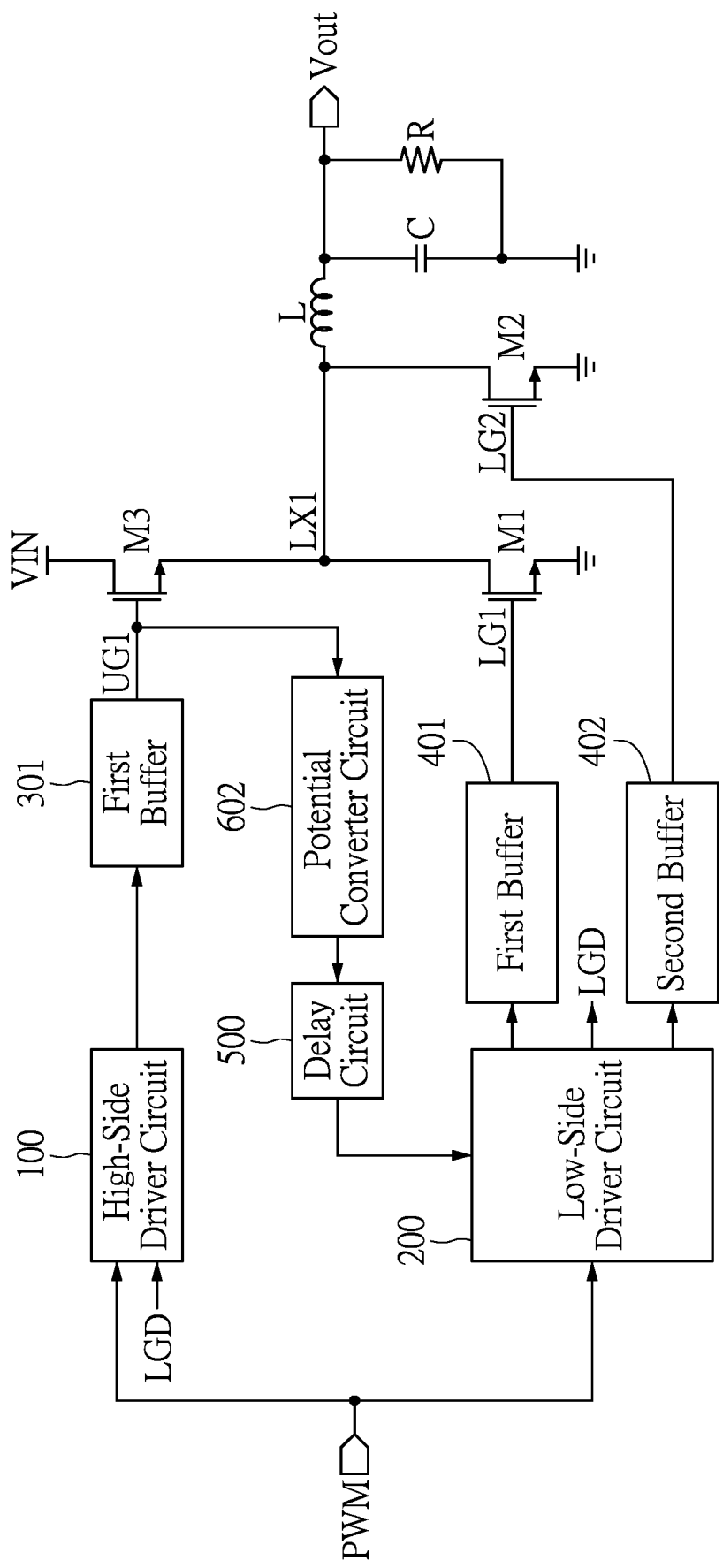
FIG. 1 is a circuit layout diagram of a power converter including switch components having different safe operating areas according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 6:
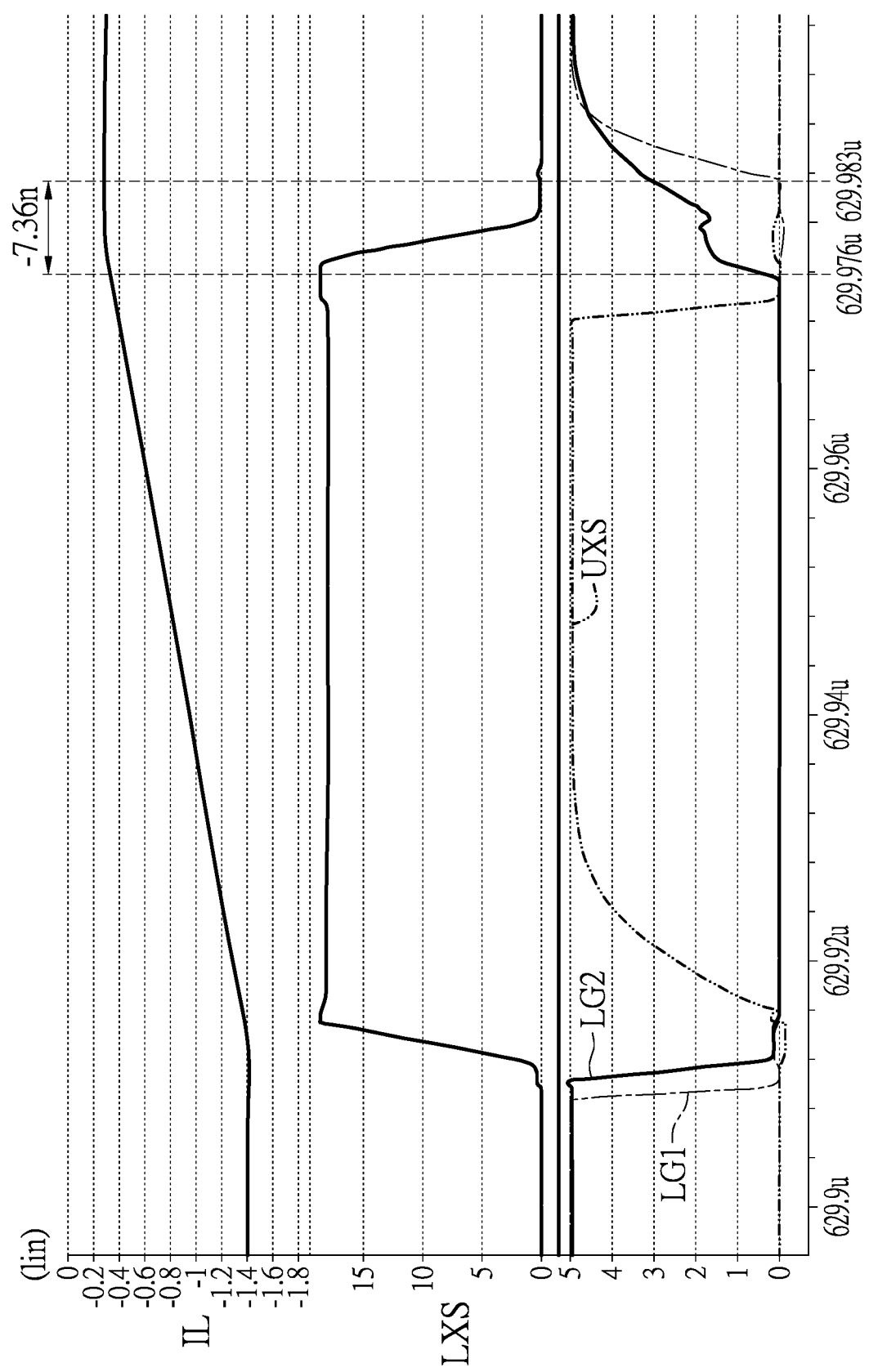
FIG. 6 is a waveform diagram of signals of the power converter including switch components having different safe operating areas according to the first to fifth embodiment of the present disclosure.
Figure 7:
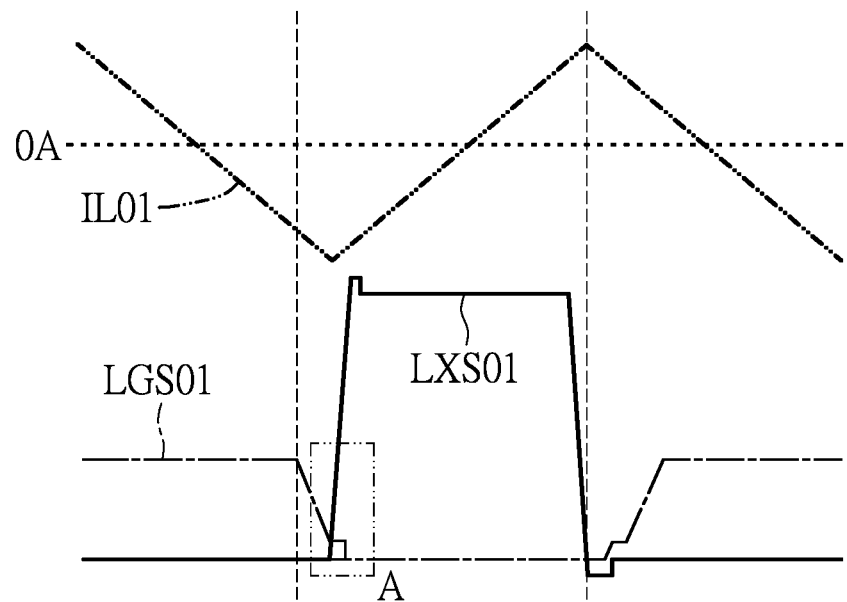
FIG. 7 is a waveform diagram of signals of a conventional power converter.
Figure 8:
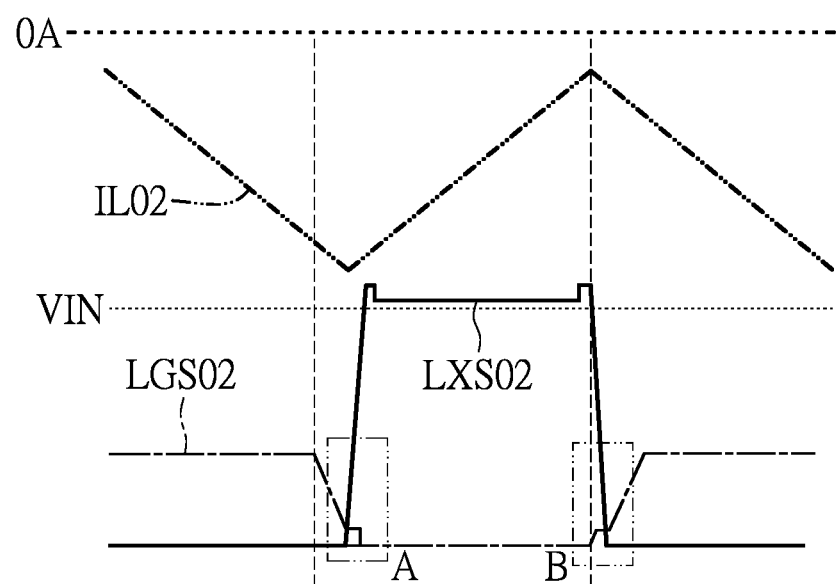
FIG. 8 is a waveform diagram of signals of the conventional power converter.
Figure 9:
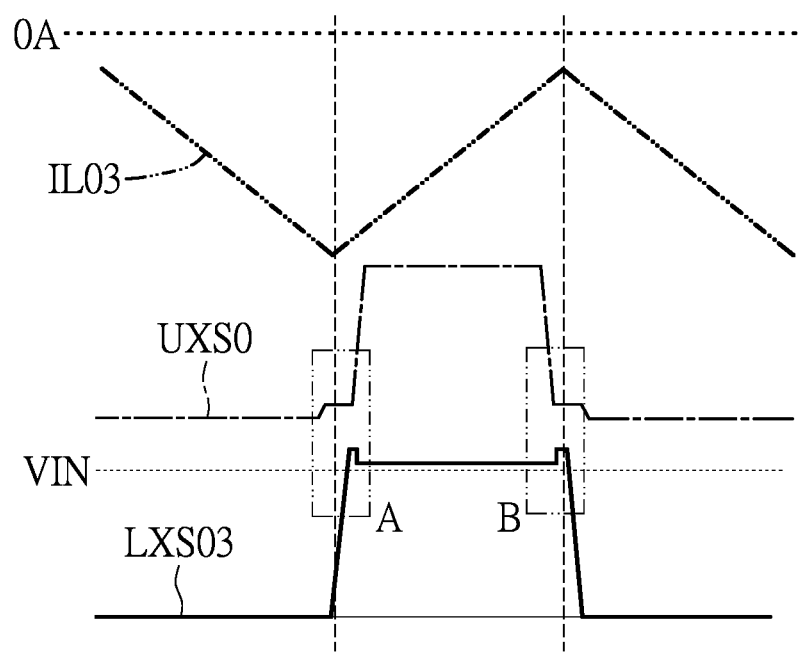
FIG. 9 is a waveform diagram of signals of the conventional power converter.

Reference is made to FIGS. 1 and 6, in which FIG. 1 is a circuit layout diagram of a power converter including switch components having different safe operating areas according to a first embodiment of the present disclosure, and FIG. 6 is a waveform diagram of signals of the power converter including switch components having different safe operating areas according to the first to fifth embodiment of the present disclosure.

The power converter described herein may be a buck converter, but the present disclosure is not limited thereto.

It is worth noting that, in the embodiment, the power converter not only includes a first high-side switch M3 and a first low-side switch M1, but also includes a second low-side switch M2. A safe operating area of the second low-side switch M2 is larger than a safe operating area of the first low-side switch M1. The second low-side switch M2 is used to protect the first low-side switch M1.

A first terminal of the first high-side switch M3 is coupled to a common voltage VIN. A first terminal of the first low-side switch M1 is connected to a second terminal of the first high-side switch M3. A second terminal of the first low-side switch M1 is grounded.

A first node LX1 between the second terminal of the first high-side switch M3 and the first terminal of the first low-side switch M1 is grounded through a series circuit. An inductor L is connected to a capacitor C in series to form the series circuit. In detail, the first node LX1 is connected to a first terminal of the inductor L. A second terminal of the inductor L is connected to a first terminal of the capacitor C. A second terminal of the capacitor C is grounded. An output node between the inductor L and the capacitor C is an output terminal of the power converter. An output voltage Vout is at the output node. The capacitor C may be connected to a resistor R in parallel.

A first terminal of the second low-side switch M2 is connected to a second terminal of the inductor L. In addition, the first terminal of the second low-side switch M2 is connected to the first node LX1 between the second terminal of the first high-side switch M3 and the first terminal of the first low-side switch M1. A second terminal of the second low-side switch M2 is grounded.

In the embodiment, the power converter may further include a high-side driver circuit 100 and a low-side driver circuit 200. The high-side driver circuit 100 may be connected to a control terminal of the first high-side switch M3. The low-side driver circuit 200 may be connected to a control terminal of the first low-side switch M1.

If necessary, the power converter of the embodiment may include a first buffer 301 which is used for the first high-side switch M3. The first buffer 301 is connected between the high-side driver circuit 100 and the control terminal of the first high-side switch M3. The first buffer 301 may be used as a delay or relay component for relaying or delaying a first high-side driving signal UG1 that is outputted from the high-side driver circuit 100 and will be transmitted to the first high-side switch M3.

Each of an input terminal of the high-side driver circuit 100 and an input terminal of the low-side driver circuit 200 may be connected to an external pulse wave signal generator (not shown in figures), and receive a pulse width modulation signal PWM from the external pulse wave signal generator.

The high-side driver circuit 100 may output the first high-side driving signal UG1 at a high or low level for turning on or off the first high-side switch M3, according to the pulse width modulation signal PWM.

The low-side driver circuit 200 may output a first low-side driving signal LG1 at a high or low level for turning on or off the first low-side switch M1, and output a second low-side driving signal LG2 at a high or low level for turning on or off the second low-side switch M2, according to the pulse width modulation signal PWM.

For example, when the pulse width modulation signal PWM is at a high level, the low-side driver circuit 200 outputs the first low-side driving signal LG1 at the low level for turning off the first low-side switch M1. Then, the low-side driver circuit 200 outputs the second low-side driving signal LG2 at the low level for turning off the second low-side switch M2.

Conversely, when the pulse width modulation signal PWM is at a low level, the low-side driver circuit 200 outputs the second low-side driving signal LG2 at the high level for turning on the second low-side switch M2. Then, the low-side driver circuit 200 outputs the first low-side driving signal LG1 at the high level for turning on the first low-side switch M1.

That is, after the low-side driver circuit 200 turns off the first low-side switch M1 having the smaller safe operating area, the low-side driver circuit 200 turns off the second low-side switch M2 having the larger safe operating area. Before the low-side driver circuit 200 turns on the first low-side switch M1 having the smaller safe operating area, the low-side driver circuit 200 turns on the second low-side switch M2 having the larger safe operating area.

In addition, in the embodiment, the power converter may include a first buffer 401 used for the first low-side switch M1 and a second buffer 402 used for the second low-side switch M2. The first buffer 401 is connected between an output terminal of the low-side driver circuit 200 and the control terminal of the first low-side switch M1. The second buffer 402 is connected between the output terminal of the low-side driver circuit 200 and a control terminal of the second low-side switch M2. The first buffer 401 may be used as a delay or relay component for relaying or delaying the first low-side driving signal LG1 that is outputted from the low-side driver circuit 200 and will be transmitted to the first low-side switch M1. The second buffer 402 may be used as a delay or relay component for relaying or delaying a second low-side driving signal LG2 that is outputted from the low-side driver circuit 200 and will be transmitted to the second low-side switch M2.

The first high-side switch M3 and the first low-side switch M1 are switched complementarily. Therefore, when the high-side driver circuit 100 switches the first high-side switch M3 from an off state to an on state, the low-side driver circuit 200 switches the first low-side switch M1 from an on state to an off state that is indicated by the first low-side driving signal LG1 transiting from a high level to a low level as shown in FIG. 6.

After the first low-side switch M1 having the smaller safe operating area is turned off for a period of time, the low-side driver circuit 200 turns off the second low-side switch M2 having the larger safe operating area. The second low-side switch M2 having the larger safe operating area receives energy of the inductor L. As a result, as shown in FIG. 6, a voltage signal LXS at the first node LX1 rises.

When the high-side driver circuit 100 switches the first high-side switch M3 from an on state to an off state, the low-side driver circuit 200 turns on the second low-side switch M2 that is indicated by the second low-side driving signal LG2 transiting from a low level to a high level as shown in FIG. 6. As a result, as shown in FIG. 6, the voltage signal LXS at the first node LX and a voltage signal UXS at the second terminal of the first high-side switch M3 are pulled down from a high voltage to a low voltage, by the second low-side switch M2 having the larger safe operating area. The low-side driver circuit 200 does not turn on the first low-side switch M1 until the voltage at the first node LX reaches the low voltage. Therefore, the first low-side switch M1 that has the smaller safe operating area and a small withstand voltage is prevented from being damaged due to the high voltage at the first node LX.

If necessary, the power converter may further include a potential converter circuit 602 and a delay circuit 500. An input terminal of the potential converter circuit 602 may be connected to the control terminal of the first high-side switch M3. An output terminal of the potential converter circuit 602 may be connected to an input terminal of the delay circuit 500. An output terminal of the delay circuit 500 may be connected to the input terminal of the low-side driver circuit 200.

When the first high-side switch M3 is switched from an on state to an off state and the first low-side switch M1 is switched from an off state to an on state, the potential converter circuit 602 transits the first high-side driving signal UG1 from a high level to a low level, thereby preventing an overvoltage from being applied to the first low-side switch M1. Then, the delay circuit 500 may delay a phase of the first high-side driving signal UG1.

The low-side driver circuit 200 may output a low-side conduction signal LGD to the high-side driver circuit 100 according to the first high-side driving signal UG1 from the delay circuit 500.

Second Embodiment

Figure 2:
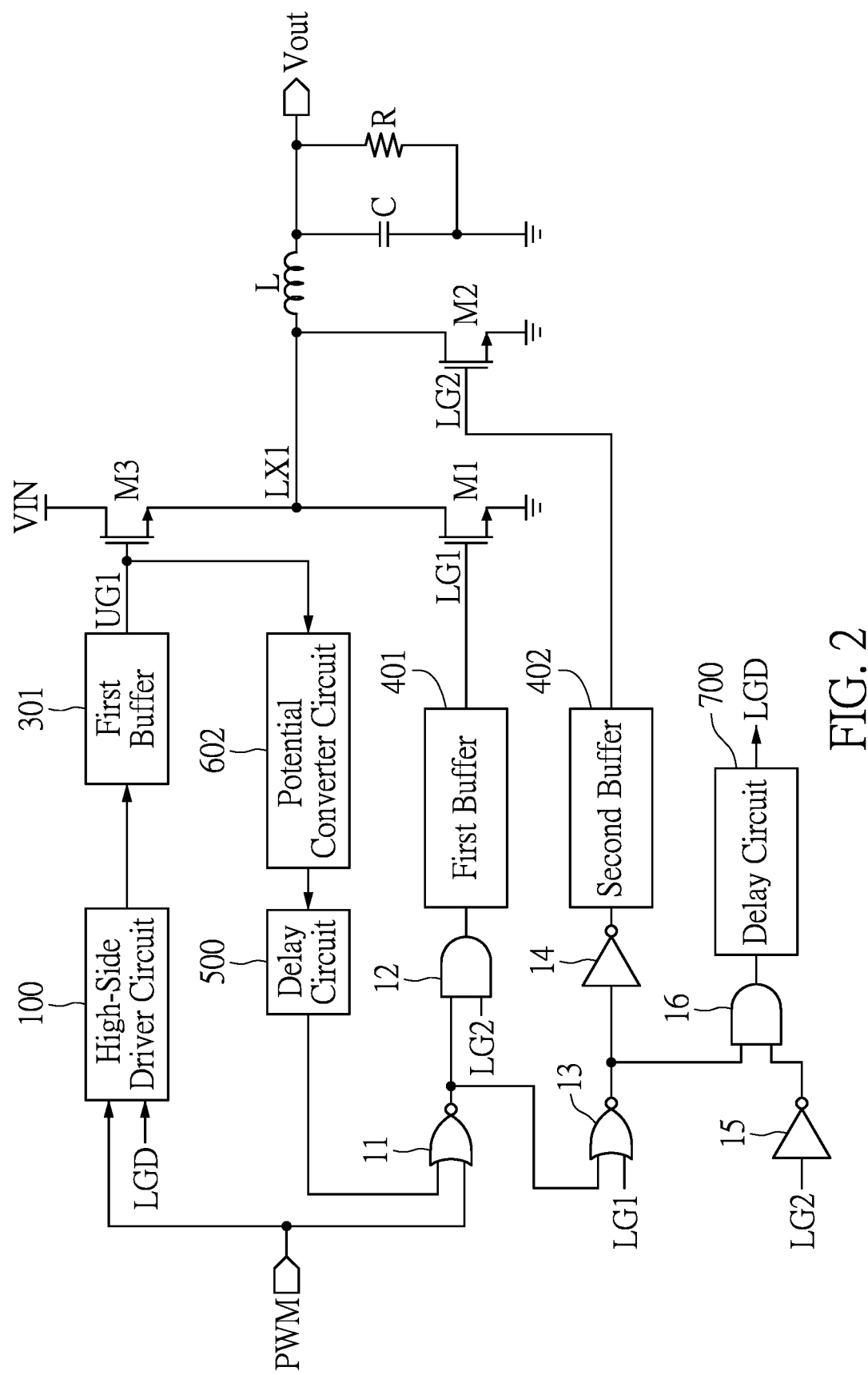
FIG. 2 is a circuit layout diagram of a power converter including switch components having different safe operating areas according to a second embodiment of the present disclosure.

Reference is made to FIG. 2, which is a circuit layout diagram of a power converter including switch components having different safe operating areas according to a second embodiment of the present disclosure. The same descriptions of the first and second embodiments are not repeated herein.

In the embodiment, the low-side driver circuit 200 may include a first NOR gate 11, a first AND gate 12, a second NOR gate 13, a second NOT gate 14, a first NOT gate 15 and a second AND gate 16.

A first input terminal of the first NOR gate 11 is connected to the control terminal of the first high-side switch M3. If necessary, a potential converter circuit 602 and a delay circuit 500 may be disposed between the control terminal of the first high-side switch M3 and the first input terminal of the first NOR gate 11.

A first input terminal of the first AND gate 12 is connected to an output terminal of the first NOR gate 11. A second input terminal of the first AND gate 12 is connected to the control terminal of the second low-side switch M2. The second input terminal of the first AND gate 12 may receive the second low-side driving signal LG2 from the second low-side switch M2. An output terminal of the first AND gate 12 may be connected to the control terminal of the first low-side switch M1. If necessary, the first buffer 401 may be disposed between the output terminal of the first AND gate 12 and the control terminal of the first low-side switch M1.

A first input terminal of the second NOR gate 13 is connected to the output terminal of the first NOR gate 11. A second input terminal of the second NOR gate 13 is connected to the control terminal of the first low-side switch M1. The second input terminal of the second NOR gate 13 may receive the first low-side driving signal LG1 from the first low-side switch M1.

An output terminal of the second NOR gate 13 may be connected to an input terminal of the second NOT gate 14. An output terminal of the second NOT gate 14 may be connected to the control terminal of the second low-side switch M2. If necessary, the second buffer 402 may be disposed between the output terminal of the second NOT gate 14 and the control terminal of the second low-side switch M2.

An input terminal of the first NOT gate 15 is connected to the control terminal of the second low-side switch M2. The input terminal of the first NOT gate 15 may receive the second low-side driving signal LG2 from the second low-side switch M2. A first input terminal of the second AND gate 16 is connected to the output terminal of the second NOR gate 13. A second input terminal of the second AND gate 16 is connected to an output terminal of the first NOT gate 15. An output terminal of the second AND gate 16 is connected to the input terminal of the high-side driver circuit 100. The second AND gate 16 may output the low-side conduction signal LGD.

If necessary, the power converter may further include a delay circuit 700. The delay circuit 700 is connected between the output terminal of the second AND gate 16 and the input terminal of the high-side driver circuit 100. The delay circuit 700 may be configured to delay a phase of the low-side conduction signal LGD that will be outputted to the high-side driver circuit 100.

Third Embodiment

Figure 3:
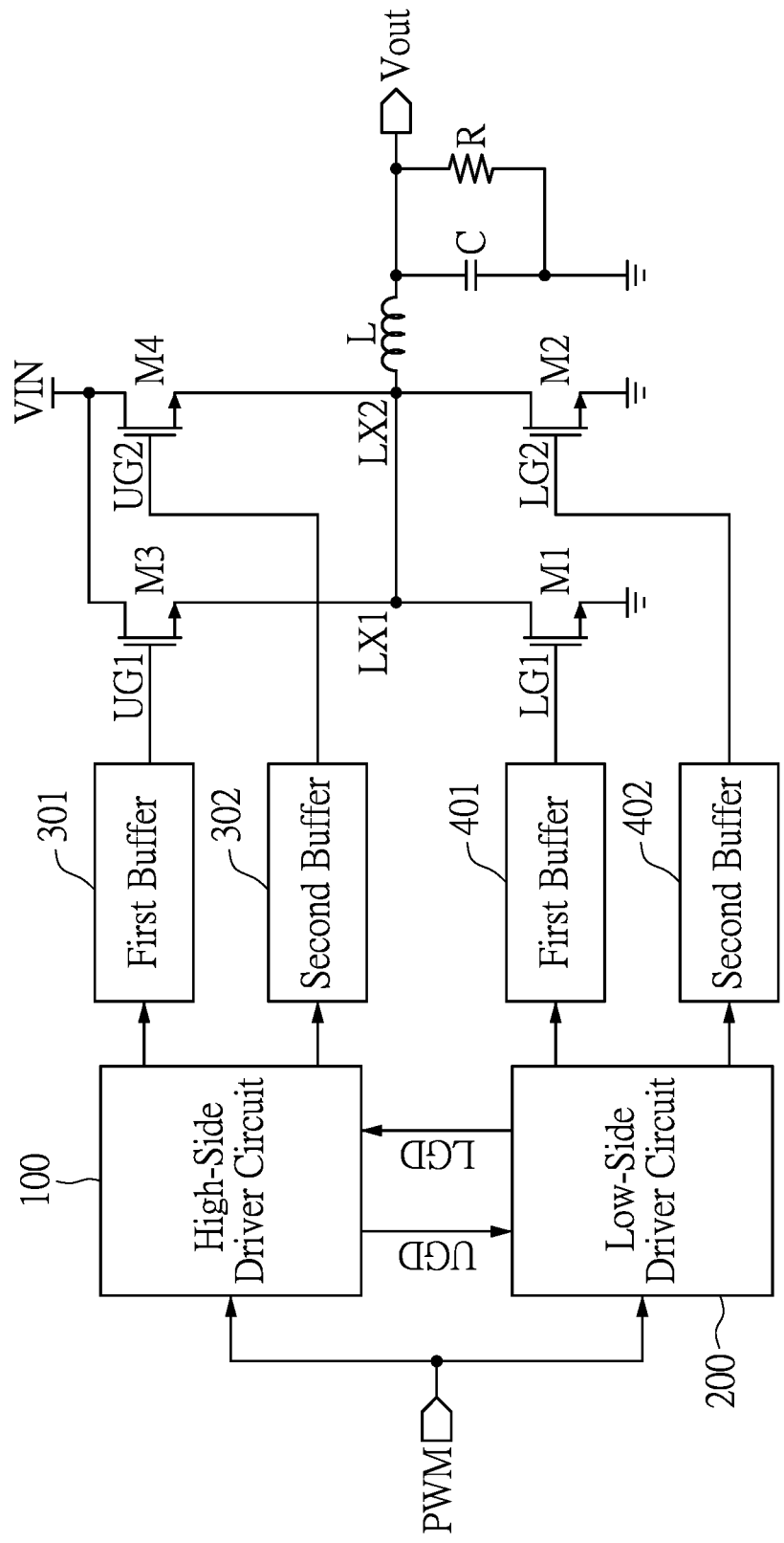
FIG. 3 is a circuit layout diagram of a power converter including switch components having different safe operating areas according to a third embodiment of the present disclosure.

Reference is made to FIG. 3, which is a circuit layout diagram of a power converter including switch components having different safe operating areas according to a third embodiment of the present disclosure. The same descriptions of the first to third embodiments are not repeated herein.

It is worth noting that, in the embodiment, the power converter not only includes the first high-side switch M3, but also includes a second high-side switch M4. A safe operating area of the second high-side switch M4 is larger than a safe operating area of the first high-side switch M3.

A first terminal of the second high-side switch M4 is coupled to the common voltage VIN. A control terminal of the second high-side switch M4 is connected to an output terminal of the high-side driver circuit 100. If necessary, a second buffer 302 may be disposed between the control terminal of the second high-side switch M4 and the output terminal of the high-side driver circuit 100.

A second terminal of the second high-side switch M4 is connected to the first terminal of the second low-side switch M2. A second node LX2 between the second terminal of the second high-side switch M4 and the first terminal of the second low-side switch M2 is connected to the first node LX1 and the first terminal of the inductor L. The second terminal of the inductor L is connected to the first terminal of the capacitor C. The second terminal of the capacitor C is grounded. The capacitor C may be connected to the resistor R in parallel.

It is worth noting that, when the low-side driver circuit 200 switches the first low-side switch M1 from an on state to an off state, the high-side driver circuit 100 turns on the second high-side switch M4. After the second high-side switch M4 having the larger safe operating area is turned on for a period of time, the high-side driver circuit 100 turns on the first high-side switch M3 having the smaller safe operating area. Conversely, when the low-side driver circuit 200 switches the first low-side switch M1 from the off state to the on state, the high-side driver circuit 100 turns off the first high-side switch M3. After the first high-side switch M3 having the smaller safe operating area is turned off for a period of time, the high-side driver circuit 100 turns off the second high-side switch M4 having the larger safe operating area.

In addition, the high-side driver circuit 100 may output a high-side conduction signal UGD to the low-side driver circuit 200 to control the low-side driver circuit 200, according to the pulse width modulation signal PWM and the low-side conduction signal LGD outputted by the low-side driver circuit 200.

Fourth Embodiment

Figure 4:
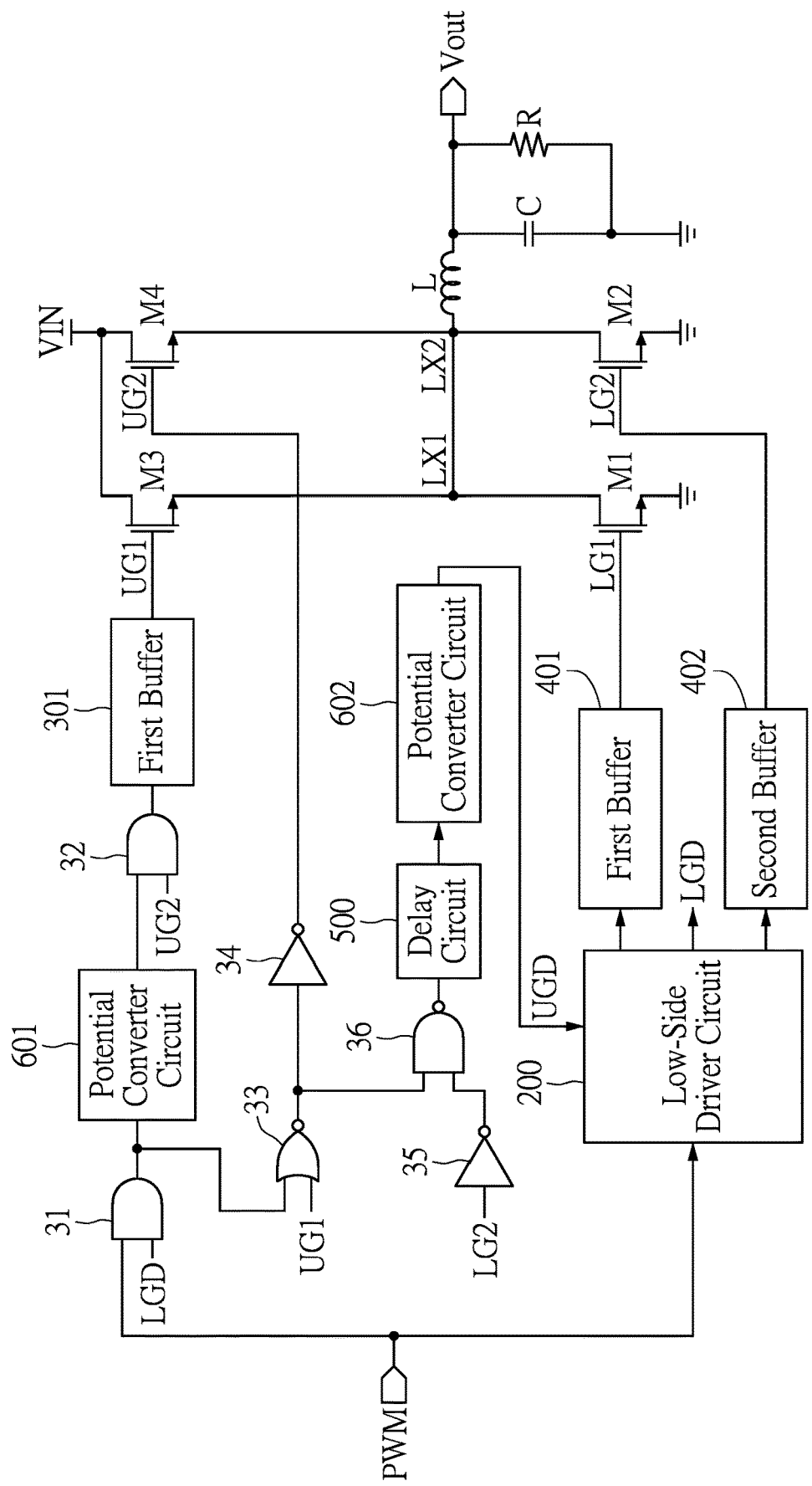
FIG. 4 is a circuit layout diagram of a power converter including switch components having different safe operating areas according to a fourth embodiment of the present disclosure.

Reference is made to FIG. 4, which is a circuit layout diagram of a power converter including switch components having different safe operating areas according to a fourth embodiment of the present disclosure. The same descriptions of the first to fourth embodiments are not repeated herein.

In the embodiment, the high-side driver circuit 100 may include a first AND gate 31, a second AND gate 32, a first NOR gate 33, a first NOT gate 34, a second NOT gate 35 and a first NAND gate 36.

Each of the input terminal of the high-side driver circuit 100 and a first input terminal of the first AND gate 31 may be connected to an output terminal of the external pulse wave signal generator (not shown in figures), and receive the pulse width modulation signal PWM from the external pulse wave signal generator. A second input terminal of the first AND gate 31 is connected to the output terminal of the low-side driver circuit 200 and receives the low-side conduction signal LGD from the low-side driver circuit 200.

A first input terminal of the second AND gate 32 is connected to an output terminal of the first AND gate 31. A second input terminal of the second AND gate 32 may be connected to the control terminal of the second high-side switch M4 and receive a second high-side driving signal UG2 from the second high-side switch M4. If necessary, a potential converter circuit 601 may be disposed between the first input terminal of the second AND gate 32 and the output terminal of the first AND gate 31.

An output terminal of the second AND gate 32 may be connected to the control terminal of the first high-side switch M3. If necessary, the first buffer 301 may be disposed between the output terminal of the second AND gate 32 and the control terminal of the first high-side switch M3.

A first input terminal of the first NOR gate 33 is connected to the output terminal of the first AND gate 31. A second input terminal of the first NOR gate 33 is connected to the control terminal of the first high-side switch M3. An output terminal of the first NOR gate 33 is connected to an input terminal of the first NOT gate 34. An output terminal of the first NOT gate 34 is connected to the control terminal of the second high-side switch M4.

An input terminal of the second NOT gate 35 is connected to the control terminal of the second low-side switch M2. A first input terminal of the first NAND gate 36 is connected to the output terminal of the first NOR gate 33. A second input terminal of the first NAND gate 36 is connected to an output terminal of the second NOT gate 35.

An output terminal of the first NAND gate 36 is connected to the input terminal of the low-side driver circuit 200. If necessary, the delay circuit 500 and the potential converter circuit 602 may be disposed between the output terminal of the first NAND gate 36 and the input terminal of the low-side driver circuit 200.

Fifth Embodiment

Figure 5:
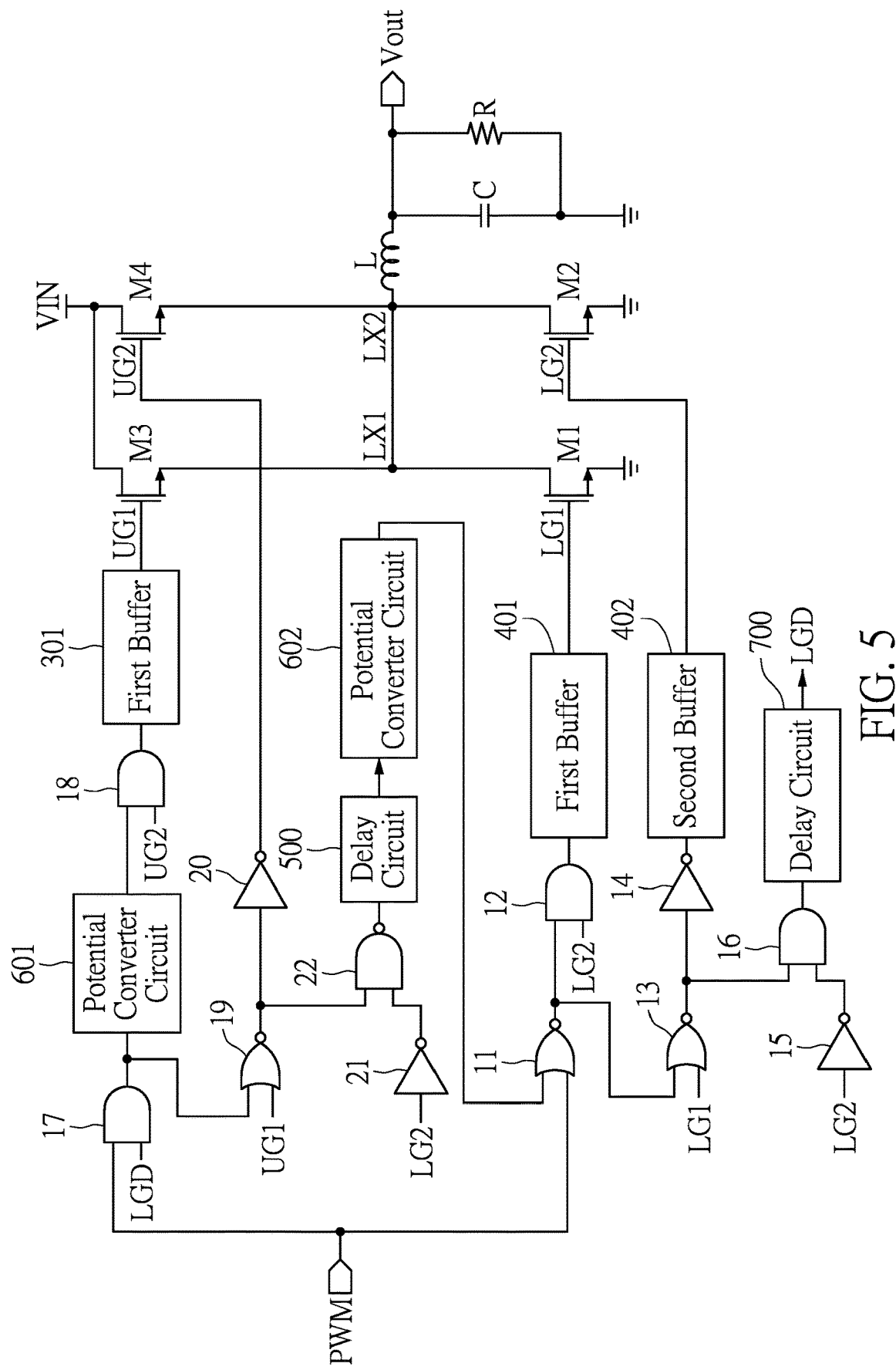
FIG. 5 is a circuit layout diagram of a power converter including switch components having different safe operating areas according to a fifth embodiment of the present disclosure.

Reference is made to FIG. 5, which is a circuit layout diagram of a power converter including switch components having different safe operating areas according to a fifth embodiment of the present disclosure.

The high-side driver circuit 100 of the fifth embodiment includes a third AND gate 17, a fourth AND gate 18, a third NOR gate 19, a third NOT gate 20, a fourth NOT gate 21 and a first NAND gate 22 that are respectively the same as the first AND gate 31, the second AND gate 32, the first NOR gate 33, the first NOT gate 34, the second NOT gate 35 and the first NAND gate 36 as described above. The same descriptions are not repeated herein.

The low-side driver circuit 200 of the fifth embodiment includes a first NOR gate 11, a second NOR gate 13, a first NOT gate 15, a second NOT gate 14, a first AND gate 12 and a second AND gate 16 that are the same as those in the second embodiment. The same descriptions are not repeated herein.

In summary, the present disclosure provides the power converter including switch components having different safe operating areas. The two high-side switches or the two low-side switches have different safe operating areas and are used in the power converter of the present disclosure. Only a small layout area in the power converter needs to be used to realize small on-resistances (RONs) of the low-side and high-side switches. Therefore, a size of the power converter is reduced. The high-side switch or low-side switch that has a poor withstand voltage is prevented from being damaged due to the excessive voltage or an excessive current.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter including switch components having different safe operating areas, comprising:
    a first high-side switch, wherein a first terminal of the first high-side switch is coupled to a common voltage;
    a first low-side switch, wherein a first terminal of the first low-side switch is connected to a second terminal of the first high-side switch, and a second terminal of the first low-side switch is grounded;
    a second low-side switch, wherein a first terminal of the second low-side switch is connected to a first node between the second terminal of the first high-side switch and the first terminal of the first low-side switch, a second terminal of the second low-side switch is grounded, and the first node is grounded through a series circuit, wherein an inductor is connected to a capacitor in series to form the series circuit;
    a high-side driver circuit connected to a control terminal of the first high-side switch and configured to turn on or off the first high-side switch; and
    a low-side driver circuit connected to a control terminal of the first low-side switch and configured to turn on or off the first low-side switch;
    wherein a safe operating area of the second low-side switch is larger than a safe operating area of the first low-side switch;
    wherein the first high-side switch and the first low-side switch are switched complementarily;
    wherein, after the low-side driver circuit turns off the first low-side switch, the low-side driver circuit turns off the second low-side switch;
    wherein, before the low-side driver circuit turns on the first low-side switch, the low-side driver circuit turns on the second low-side switch.

2. The power converter including switch components having different safe operating areas according to claim 1, further comprising:
    a resistor connected to the capacitor in parallel, wherein an output node between the capacitor and the inductor is an output terminal of the power converter.

3. The power converter including switch components having different safe operating areas according to claim 1, wherein the low-side driver circuit includes a first NOR gate, a second NOR gate, a first NOT gate, a second NOT gate, a first AND gate, and a second AND gate;
    wherein a first input terminal of the first NOR gate is connected to the control terminal of the first high-side switch, a second input terminal of the first NOR gate is connected to an output terminal of a pulse wave signal generator, two input terminals of the first AND gate are respectively connected to an output terminal of the first NOR gate and a control terminal of the second low-side switch, and an output terminal of the first AND gate is connected to the control terminal of the first low-side switch;
    wherein two input terminals of the second NOR gate are respectively connected to the output terminal of the first NOR gate and the control terminal of the first low-side switch, an output terminal of the second NOR gate is connected to an input terminal of the second NOT gate, an output terminal of the second NOT gate is connected to the control terminal of the second low-side switch, an input terminal of the first NOT gate is connected to the control terminal of the second low-side switch, two input terminals of the second AND gate are respectively connected to the output terminal of the second NOR gate and an output terminal of the first NOT gate, and an input terminal of the high-side driver circuit is connected to an output terminal of the second AND gate and the output terminal of a pulse wave signal generator.

4. The power converter including switch components having different safe operating areas according to claim 3, further comprising:
    a first buffer connected between the output terminal of the first AND gate and the control terminal of the first low-side switch.

5. The power converter including switch components having different safe operating areas according to claim 4, further comprising:

a second buffer connected between the output terminal of the second NOT gate and the control terminal of the second low-side switch.

6. The power converter including switch components having different safe operating areas according to claim 3, further comprising:
a second high-side switch, wherein a first terminal of the second high-side switch is coupled to the common voltage, a control terminal of the second high-side switch is connected to an output terminal of the high-side driver circuit, a second terminal of the second high-side switch is connected to the first terminal of the second low-side switch, and a second node between the second terminal of the second high-side switch and the first terminal of the second low-side switch is grounded through the series circuit;
wherein a safe operating area of the second high-side switch is larger than a safe operating area of the first high-side switch.

7. The power converter including switch components having different safe operating areas according to claim 6, wherein the high-side driver circuit includes a third AND gate, a fourth AND gate, a third NOR gate, a third NOT gate, a fourth NOT gate and a first NAND gate;
wherein a first input terminal of the third AND gate is connected to the output terminal of a pulse wave signal generator, a second input terminal of the third AND gate is connected to the output terminal of the second AND gate, a first input terminal of the fourth AND gate is connected to an output terminal of the third AND gate, a second input terminal of the fourth AND gate is connected to the control terminal of the second high-side switch, and the output terminal of the second AND gate is connected to the control terminal of the first high-side switch;
wherein two input terminals of the third NOR gate are respectively connected to the output terminal of the third AND gate and the control terminal of the first high-side switch, an output terminal of the third NOR gate is connected to an input terminal of the third NOT gate, an output terminal of the third NOT gate is connected to the control terminal of the second high-side switch, an input terminal of the fourth NOT gate is connected to the control terminal of the second low-side switch, two input terminals of the first NAND gate are respectively connected to the output terminal of the third NOR gate and an output terminal of the fourth NOT gate, and an output terminal of the first NAND gate is connected to the first input terminal of the first NOR gate.

8. The power converter including switch components having different safe operating areas according to claim 7, further comprising:
a delay circuit connected between the output terminal of the first NAND gate and the first input terminal of the first NOR gate.

9. The power converter including switch components having different safe operating areas according to claim 8, further comprising:
a potential converter circuit connected between an output terminal of the delay circuit and the first input terminal of the fourth AND gate.

10. The power converter including switch components having different safe operating areas according to claim 1, further comprising:
a second high-side switch, a first terminal of the second high-side switch is coupled to the common voltage, a control terminal of the second high-side switch is connected to an output terminal of the high-side driver circuit, a second terminal of the second high-side switch is connected to the first terminal of the second low-side switch, and a second node between the second terminal of the second high-side switch and the first terminal of the second low-side switch is grounded through the series circuit;
wherein a safe operating area of the second high-side switch is larger than a safe operating area of the first high-side switch.

11. The power converter including switch components having different safe operating areas according to claim 10, wherein, after the high-side driver circuit turns off the first high-side switch, the high-side driver circuit turns off the second high-side switch;
wherein, before the high-side driver circuit turns on the first high-side switch, the high-side driver circuit turns on the second high-side switch.

12. The power converter including switch components having different safe operating areas according to claim 11, wherein the high-side driver circuit includes a first AND gate, a second AND gate, a first NOR gate, a first NOT gate, a second NOT gate and a first NAND gate;
wherein a first input terminal of the first AND gate is connected to an output terminal of a pulse signal generator, a second input terminal of the first AND gate is connected to an output terminal of the low-side driver circuit, a first input terminal of the second AND gate is connected to an output terminal of the first AND gate, a second input terminal of the second AND gate is connected to the control terminal of the second high-side switch, an output terminal of the second AND gate is connected to an input terminal of the high-side driver circuit, the output terminal of the second AND gate is connected to the control terminal of the first high-side switch;
wherein a first input terminal of the first NOR gate is connected to the output terminal of the first AND gate, a second input terminal of the first NOR gate is connected to the control terminal of the first high-side switch, an output terminal of the first NOR gate is connected to an input terminal of the first NOT gate, an output terminal of the first NOT gate is connected to the control terminal of the second high-side switch, an input terminal of the second NOT gate is connected to a control terminal of the second low-side switch;
wherein two input terminals of the first NAND gate are respectively connected to the output terminal of the first NOR gate and an output terminal of the second NOT gate, and an output terminal of the first NAND gate is connected to an input terminal of the low-side driver circuit.

13. The power converter including switch components having different safe operating areas according to claim 12, further comprising:
a potential converter circuit connected between the output terminal of the first AND gate and the first input terminal of the second AND gate.

14. The power converter including switch components having different safe operating areas according to claim 12, further comprising:
a first buffer connected between the output terminal of the second AND gate and the control terminal of the first high-side switch.

* * * * *